US007444809B2

(12) United States Patent
Smith et al.

(10) Patent No.: US 7,444,809 B2
(45) Date of Patent: Nov. 4, 2008

(54) HYDRAULIC REGENERATION SYSTEM

(75) Inventors: David P. Smith, Reddick, IL (US); Daniel T. Mather, Lockport, IL (US)

(73) Assignees: Caterpillar Inc., Peoria, IL (US); Shin Caterpillar Mitsubishi Ltd (JP)

( * ) Notice: Subject to any disclaimer, the term of this patent is extended or adjusted under 35 U.S.C. 154(b) by 284 days.

(21) Appl. No.: 11/341,630

(22) Filed: Jan. 30, 2006

(65) Prior Publication Data

US 2007/0186548 A1 Aug. 16, 2007

(51) Int. Cl.
*F16D 31/02* (2006.01)

(52) U.S. Cl. .......................................... 60/414; 60/413

(58) Field of Classification Search .................. 60/413, 60/414

See application file for complete search history.

(56) References Cited

U.S. PATENT DOCUMENTS

| | | | | |
|---|---|---|---|---|
| 3,477,347 | A | 11/1969 | Rice | |
| 4,345,436 | A | 8/1982 | Johnson | |
| 5,878,569 | A * | 3/1999 | Satzler | 60/418 |
| 6,151,894 | A | 11/2000 | Endo et al. | |
| 6,358,174 | B1 | 3/2002 | Folsom et al. | |
| 6,378,301 | B2 | 4/2002 | Endo et al. | |
| 6,467,264 | B1 | 10/2002 | Stephenson et al. | |
| 6,502,393 | B1 | 1/2003 | Stephenson et al. | |
| 6,615,786 | B2 | 9/2003 | Mori et al. | |
| 6,655,136 | B2 | 12/2003 | Holt et al. | |
| 6,718,759 | B1 | 4/2004 | Tabor | |
| 6,739,127 | B2 | 5/2004 | Nippert et al. | |
| 6,748,738 | B2 | 6/2004 | Smith | |
| 6,789,387 | B2 | 9/2004 | Brinkman | |

FOREIGN PATENT DOCUMENTS

| | | |
|---|---|---|
| EP | 1413773 | 4/2004 |

* cited by examiner

*Primary Examiner*—F. Daniel Lopez
(74) *Attorney, Agent, or Firm*—Finnegan, Henderson, Farabow, Garrett & Dunner

(57) ABSTRACT

A hydraulic system for a work machine is provided. The hydraulic regeneration system has a tank, a primary source, a first actuator, an accumulator, and a first valve mechanism. The tank is configured to hold a supply of fluid. The primary source is configured to pressurize the fluid and has a suction inlet and a discharge outlet. The first actuator is configured to receive pressurized fluid from the discharge outlet of the primary source. The accumulator is in fluid communication with the tank, the suction inlet of the primary source, and the first actuator. The first valve mechanism is disposed between the suction inlet of the primary source and the accumulator, and is movable between a first position at which fluid returning from the first actuator is directed to the suction inlet of the primary source, and a second position at which fluid returning from the first actuator is directed to only the accumulator.

27 Claims, 3 Drawing Sheets

| ACTUATOR | OPERATION | OPEN VALVES |
|---|---|---|
| 20a,b | extend | 32, 38 |
| | retract | 36, 34 |
| 20a,b | retract with regeneration | 36, 82 |
| 20c | extend | 32, 38 |
| | retract | 36, 34 |
| 20a,b | retract with regeneration | 82 |
| 20c | extend | 32, 70 |
| 20a,b | extend assist | 32, 38, 86 |
| 20a,b | extend assist | 38, 86 |
| 20c | retract | 36, 84 |
| 20a,b | ride control | 82, 122, 32;120 |
| 12 | engine assist | 86 |
| 44 | transmission to accumulator | 88 |
| 44 | accumulator to transmission | 90 |

*FIG. 3*

HYDRAULIC REGENERATION SYSTEM

TECHNICAL FIELD

The present disclosure relates to a hydraulic system and, more particularly, to a system and method for accumulating and using regenerated hydraulic energy.

BACKGROUND

Work machines such as, for example, dozers, loaders, excavators, motor graders, and other types of heavy-machinery use one or more hydraulic actuators to accomplish a variety of tasks. These actuators are fluidly connected to a pump on the work machine that provides pressurized fluid to chambers within the actuators. As the pressurized fluid moves into or through the chambers, the pressure of the fluid acts on hydraulic surfaces of the chambers to effect movement of the actuator and a connected work tool. When the pressurized fluid is drained from the chambers it is returned to a low pressure sump on the work machine.

One problem associated with this type of hydraulic arrangement involves efficiency. In particular, the fluid draining from the actuator chambers to the sump has a pressure greater than the pressure of the fluid already within the sump. As a result, the higher pressure fluid draining into the sump still contains some energy that is wasted upon entering the low pressure sump. This wasted energy reduces the efficiency of the hydraulic system.

One method of improving the efficiency of such a hydraulic system is described in U.S. Pat. No. 6,748,738 (the '738 patent) issued to Smith on Jun. 15, 2004. The '738 patent describes a hydraulic regeneration system having a first actuator, a second actuator, a third actuator, and a source of pressurized fluid. A directional control valve is disposed between the source and each of the first, second, and third actuators. An accumulator is used to store pressurized fluid and selectively discharge pressurized fluid to increase the efficiency of the work machine.

The system of the '738 patent is configured to regenerate hydraulic energy during operation under an overrunning load. In particular, when a load on an actuator naturally assists movement of the actuator in a desired direction, fluid exiting the actuator is pressurized by the load to a useful level. The system of the '738 patent directs this gravity-pressurized fluid from the actuator through the associated directional control valve to assist the source of pressurized fluid, to assist other actuators within the system, and to fill the accumulator. Once the accumulator is filled, the reserve of pressurized fluid therein is used to supplement or replace fluid typically provided by the source to the actuators, to provide torque-assist to the source, to assist propulsion of an associated work machine, and to torque-assist an associated engine by driving the source as a motor. During a regeneration event, the output of pressurized fluid from the source may be reduced or cease completely.

Although the system of the '738 patent may have improved efficiency compared to a conventional hydraulic system, it may be expensive and limited. Specifically, each of the three directional control valves includes a set of four independent metering valves. This large number of metering valves may significantly increase the cost of the system. In addition, because operation of the source varies in response to a regeneration event, operation of the engine driving the source may also vary. If the engine operation varies enough, efficiency of the engine may be reduced. Furthermore, the system of the '738 patent does not provide a way to utilize the source to power retract an actuator during a regeneration event associated with that actuator. Without this ability, power retraction of the actuator may be very inefficient.

The hydraulic regeneration system of the present invention solves one or more of the problems set forth above.

SUMMARY OF THE INVENTION

In one aspect, the present disclosure is directed to a hydraulic system that includes a tank, a primary source, a first actuator, an accumulator, and a first valve mechanism. The tank is configured to hold a supply of fluid. The primary source is configured to pressurize the fluid, and has a suction inlet and a discharge outlet. The first actuator is configured to receive pressurized fluid from the discharge outlet of the primary source. The accumulator is in fluid communication with the tank, the suction inlet of the primary source, and the first actuator. The first valve mechanism is disposed between the suction inlet of the primary source and the accumulator, and is movable between a first position at which fluid returning from the first actuator is directed to the suction inlet of the primary source, and a second position at which fluid returning from the first actuator is directed to only the accumulator.

In another aspect, the present disclosure is directed to a hydraulic system that includes a tank, a primary source, a first actuator, and an accumulator. The tank is configured to hold a supply of fluid. The primary source is configured to pressurize the fluid and has a suction inlet and a discharge outlet. The first actuator is configured to receive pressurized fluid from the discharge outlet of the primary source. The accumulator is in fluid communication with the tank, the suction inlet of the primary source, and the first actuator. Fluid from the first actuator is directed to the accumulator simultaneous to the direction of pressurized fluid from the primary source to the first actuator.

In yet another aspect, the present disclosure is directed to a hydraulic system that has a tank, a primary source, a first actuator, and a second actuator. The tank is configured to hold a supply of fluid. The primary source is configured to pressurize the fluid. The first actuator is in communication with the tank and the primary source. The second actuator is in communication with the tank, the primary source, and the first actuator, The first actuator is configured to receive pressurized fluid from the primary source and simultaneously expel pressurized fluid to the second actuator.

In yet another aspect, the present disclosure is directed to a hydraulic system that includes a tank, a primary source, a first actuator, and a second actuator. The tank is configured to hold a supply of fluid. The primary source is configured to pressurize the fluid. The first actuator is in communication with the tank and the primary source, and configured to selectively expel fluid to the second actuator. The second actuator is in communication with the tank, the primary source, and the first actuator, and configured to selectively expel fluid to the first actuator.

In yet another aspect, the present disclosure is directed to a hydraulic system that includes a tank configured to hold a supply of fluid, and a primary source configured to pressurize the fluid. The hydraulic system also includes a first actuator in communication with the tank and the primary source. The first actuator has a first chamber and a second chamber. The hydraulic system further includes a second actuator in communication with the tank, the primary source, and the first actuator. The second actuator has a third chamber and a fourth chamber. The hydraulic system additionally includes a first, second, third, fourth, fifth, sixth, seventh, eighth, and ninth valve mechanisms. The first valve mechanism is configured to fluidly communicate the primary source and the first chamber. The second valve mechanism is configured to fluidly communicate the primary source and the second chamber. The third valve mechanism, is configured to fluidly communicate the first chamber and the tank. The fourth valve mechanism is configured to fluidly communicate the second chamber and the tank. The fifth valve mechanism is configured to fluidly communicate the primary source and the third chamber. The sixth valve mechanism is configured to fluidly communicate the primary source and the fourth chamber. The seventh valve mechanism is configured to fluidly communicate the third chamber and the tank. The eighth valve mechanism is configured to fluidly communicate the fourth chamber and the tank. The ninth valve mechanism is configured to fluidly communicate the second and fourth chambers.

In yet another aspect, the present disclosure is directed to a method of operating a hydraulic system. The method includes pressurizing a fluid and directing the pressurized fluid to first actuator. The method also includes selectively directing fluid from the first actuator to a source of the pressurized fluid, and selectively directing fluid from the first actuator to only an accumulator.

BRIEF DESCRIPTION OF THE DRAWINGS

FIG. 3 is a table illustrating different exemplary disclosed fluid connections and associated system operations possible during the operation of the hydraulic system of FIG. 2.

DETAILED DESCRIPTION

Figure 1:
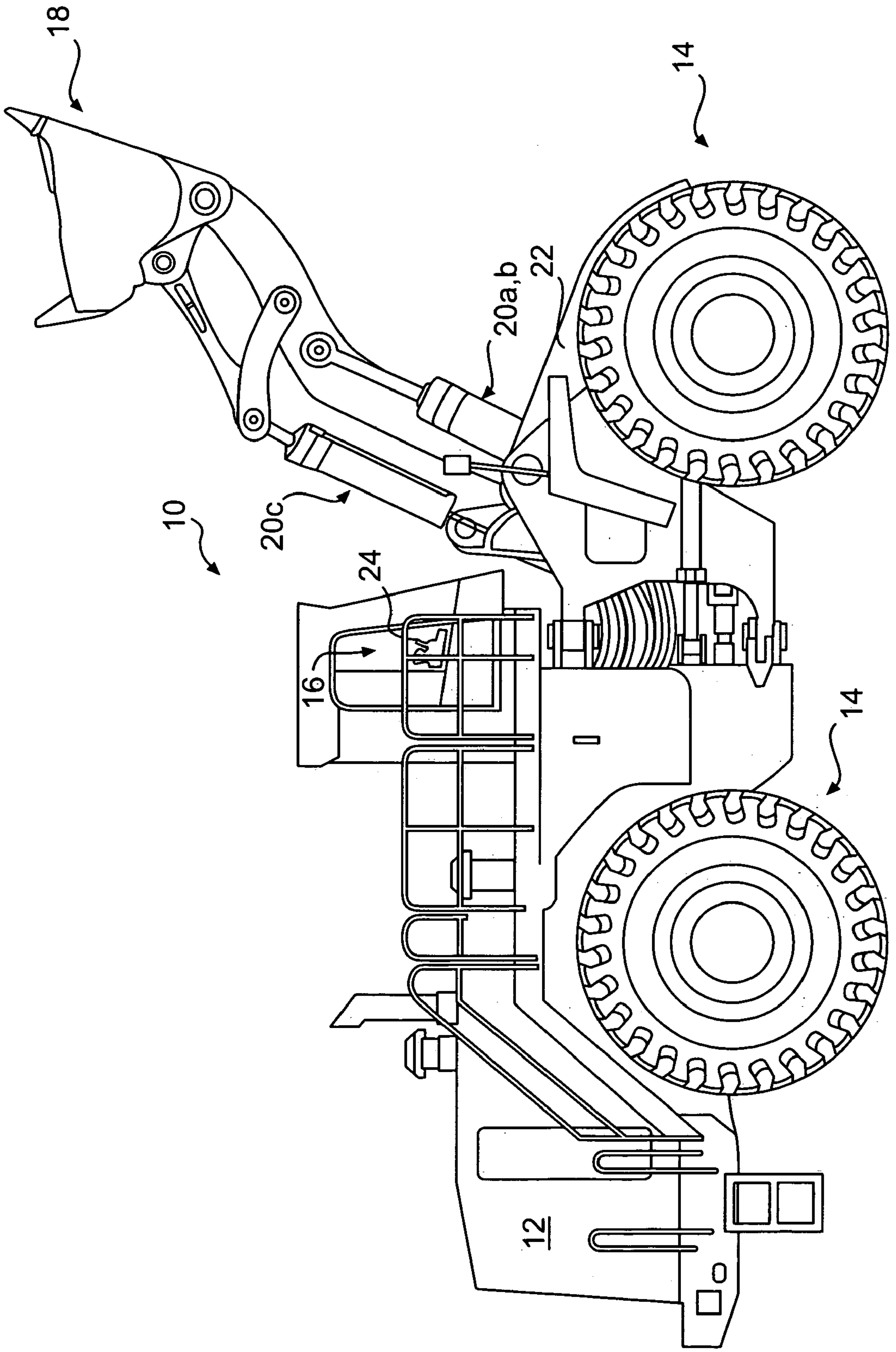
FIG. 1 is a pictorial illustration of an exemplary disclosed work machine.

FIG. 1 illustrates an exemplary embodiment of a work machine 10. Work machine 10 may be a mobile or stationary machine that performs some type of operation associated with an industry such as mining, construction, farming, or any other industry known in the art. For example, work machine 10 may embody an earth moving machine such as a wheel loader, a haul truck, a backhoe, a motor grader, or any other suitable operation-performing work machine. Work machine 10 may alternatively embody a generator set, a pump, or another stationary work machine. Work machine 10 may include a power source 12, a traction device 14, an operator cabin 16, a work tool 18, and one or more hydraulic actuators 20*a-c* connecting work tool 18 to a frame 22 of work machine 10.

Power source 12 may embody an engine such as, for example, a diesel engine, a gasoline engine, a gaseous fuel-powered engine such as a natural gas engine, or any other type of engine apparent to one skilled in the art. Power source 12 may alternatively embody a non-combustion source of power such as a fuel cell, a power storage device, an electric motor, or other similar mechanism. Power source 12 may be operatively connected to drive traction device 14, thereby propelling work machine 10.

Traction device 14 may include wheels located on each side of work machine 10 (only one side shown). Alternatively, traction device 14 may include tracks, belts or other known traction devices. It is contemplated that any combination of the wheels on work machine 10 may be driven and/or steered.

Operator cabin 16 may include devices configured to receive input from a work machine operator indicative of a desired work machine steering, travel, or work tool maneuver. Specifically, operator cabin 16 may include one or more operator interface devices 24 embodied as steering wheels, single or multi-axis joysticks, or other known input devices located proximal to an operator seat. Operator interface devices 24 may be proportional-type controllers configured to move work machine 10 or work tool 18 by producing steering, position, and/or velocity control signals that are indicative of a desired work machine or work tool maneuver. It is contemplated that operator cabin 16 may be located on work machine 10 or remote from work machine 10 and connected by way of mechanical, hydraulic, pneumatic, electrical, or wireless links.

Numerous different work tools 18 may be attachable to a single work machine 10 and controllable via operator interface devices 24. Work tool 18 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the disclosed embodiment of FIG. 1 to lift and tilt relative to work machine 10, work tool 18 may alternatively or additionally rotate, slide, swing, or move in any other manner known in the art.

Figure 2:
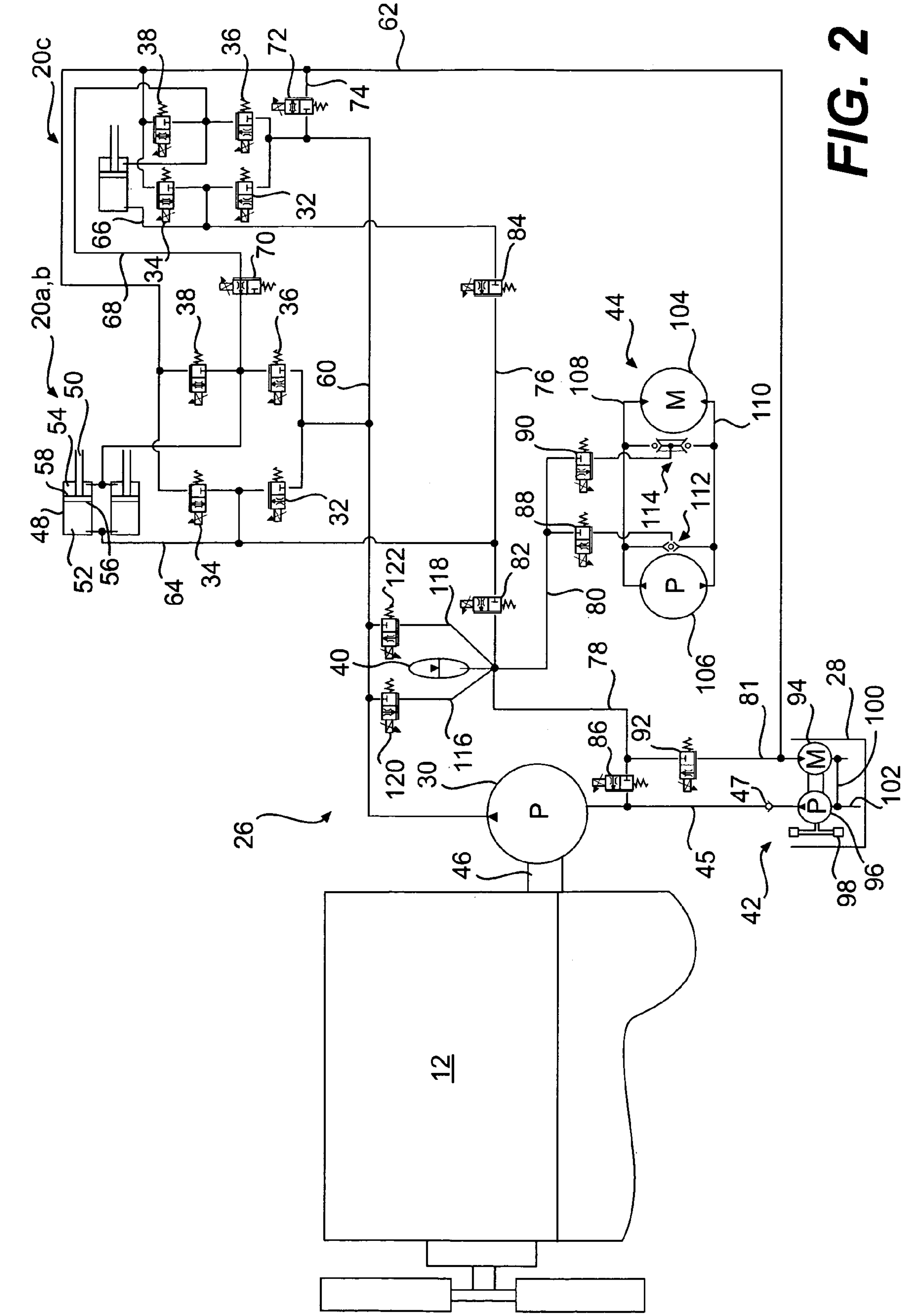
FIG. 2 is a schematic and diagrammatic illustration of an exemplary disclosed hydraulic system for use with the work machine of FIG. 1.

As illustrated in FIG. 2, work machine 10 may include a hydraulic system 26 having a plurality of fluid components that cooperate together to move work tool 18 and propel work machine 10. Specifically, hydraulic system 26 may include a tank 28 holding a supply of fluid, and a primary source 30 configured to pressurize the fluid and direct the pressurized fluid to hydraulic actuators 20*a-c*. Hydraulic system 26 may also include a head-end supply valve 32, a head-end drain valve 34, a rod-end supply valve 36, and a rod-end drain valve 38 associated with hydraulic actuators 20*a, b* and with hydraulic actuator 20*c*. Hydraulic system 26 may further include an accumulator 40, an energy recovery device 42, and a transmission unit 44. It is contemplated that hydraulic system 26 may include additional and/or different components such as, for example, pressure relief valves, makeup valves, pressure-balancing passageways, temperature sensors, position sensors, acceleration sensors, and other components known in the art.

Tank 28 may constitute a reservoir configured to hold a supply of fluid. The fluid may include, for example, a dedicated hydraulic oil, an engine lubrication oil, a transmission lubrication oil, or any other fluid known in the art. One or more hydraulic systems within work machine 10 may draw fluid from and return fluid to tank 28. It is also contemplated that hydraulic system 26 may be connected to multiple separate fluid tanks.

Primary source 30 may be connected to draw fluid from tank 28 via a suction line 45, and to pressurize the fluid to a predetermined level. Primary source 30 may embody a pump such as, for example, a variable or fixed displacement pump configured to produce a variable flow of pressurized fluid. Primary source 30 may be drivably connected to power source 12 of work machine 10 by, for example, a countershaft 46, a belt (not shown), an electrical circuit (not shown), or in any other suitable manner such that an output rotation of power source 12 results in a pumping action of primary source 30. Alternatively, primary source 30 may be connected indirectly to power source 12 via a torque converter, a gear box, or in any other manner known in the art. A check valve 47 may be disposed within suction line 45 to provide for unidirectional flow of fluid from tank 28 to primary source 30. It is contemplated that multiple sources of pressurized fluid may be interconnected-to supply pressurized fluid to hydraulic system 26, if desired.

Hydraulic actuators 20*a-c* may include fluid cylinders that connect work tool 18 to frame 22 via a direct pivot, via a linkage system with hydraulic actuators 20*a-c* forming members in the linkage system (referring to FIG. 1), or in any other appropriate manner. It is contemplated that hydraulic actuators other than fluid cylinders may alternatively be implemented within hydraulic system 26, if desired. As illustrated in FIG. 2, each of hydraulic actuators 20*a-c* may include a tube 48 and a piston assembly 50 disposed within tube 48. One of tube 48 and piston assembly 50 may be pivotally connected to frame 22 (referring to FIG. 1), while the other of tube 48 and piston assembly 50 may be pivotally connected to work tool 18. It is contemplated that tube 48 and/or piston assembly 50 may alternatively be fixedly connected to either frame 22 or work tool 18. Each of hydraulic actuators 20*a-c* may include a first chamber 52 and a second chamber 54 separated by piston assembly 50. First and second chambers 52, 54 may be selectively supplied with pressurized fluid from primary source 30 and selectively connected with tank 28 to cause piston assembly 50 to displace within tube 48, thereby changing the effective length of hydraulic actuators 20*a-c*. The expansion and retraction of hydraulic actuators 20*a-c* may assist in moving work tool 18.

Piston assembly 50 may be movable in response to a pressurized fluid. In particular, piston assembly 50 may include a first hydraulic surface 56 and a second hydraulic surface 58 disposed opposite first hydraulic surface 56. An imbalance of force caused by fluid pressure on first and second hydraulic surfaces 56, 58 may result in movement of piston assembly 50 within tube 48. For example, a force on first hydraulic surface 56 being greater than a force on second hydraulic surface 58 may cause piston assembly 50 to displace and increase the effective length of hydraulic actuators 20*a-c*. Similarly, when a force on second hydraulic surface 58 is greater than a force on first hydraulic surface 56, piston assembly 50 will retract within tube 48 and decrease the effective length of hydraulic actuators 20*a-c*. A flow rate of fluid into and out of first and second chambers 52 and 54 may determine a velocity of hydraulic actuators 20*a-c*, while a pressure of the fluid in contact with first and second hydraulic surfaces 56 and 58 may determine an actuation force of hydraulic actuators 20*a-c*. A sealing member (not shown), such as an o-ring, may be connected to piston assembly 50 to restrict a flow of fluid between an internal wall of tube 48 and an outer cylindrical surface of piston assembly 50.

Head-end supply valve 32 may be disposed between primary source 30 and first chamber 52, and configured to regulate a flow of pressurized fluid to first chamber 52 in response to flow command signal. Specifically, head-end supply valve 32 may include a proportional spring biased valve mechanism that is solenoid actuated and configured to move between a first position at which fluid is blocked from first chamber 52 and a second position at which fluid is allowed to flow into first chamber 52. Head-end supply valve 32 may be movable to any position between the first and second positions to vary the rate of flow into first chamber 52, thereby affecting the velocity of hydraulic actuators 20*a-c*. It is contemplated that head-end supply valve 32 may alternatively be hydraulically actuated, mechanically actuated, pneumatically actuated, or actuated in any other suitable manner.

Head-end drain valve 34 may be disposed between first chamber 52 and tank 28 and configured to regulate a flow of fluid from first chamber 52 to tank 28 in response to an area command signal. Specifically, head-end drain valve 34 may include a proportional spring biased valve mechanism that is solenoid actuated and configured to move between a first position at which fluid is blocked from flowing from first chamber 52 and a second position at which fluid is allowed to flow from first chamber 52. Head-end drain valve 34 may be movable to any position between the first and second positions to vary the rate of flow from first chamber 52, thereby affecting the velocity of hydraulic actuators 20*a-c*. It is contemplated that head-end drain valve 34 may alternatively be hydraulically actuated, mechanically actuated, pneumatically actuated, or actuated in any other suitable manner.

Rod-end supply valve 36 may be disposed between primary source 30 and second chamber 54, and configured to regulate a flow of pressurized fluid to second chamber 54 in response to the flow command signal. Specifically, rod-end supply valve 36 may include a proportional spring biased valve mechanism that is solenoid actuated and configured to move between a first position at which fluid is blocked from second chamber 54 and a second position at which fluid is allowed to flow into second chamber 54. Rod-end supply valve 36 may be movable to any position between the first and second positions to vary the rate of flow into second chamber 54, thereby affecting the velocity of hydraulic actuators 20*a-c*. It is contemplated that rod-end supply valve 36 may alternatively be hydraulically actuated, mechanically actuated, pneumatically actuated, or actuated in any other suitable manner.

Rod-end drain valve 38 may be disposed between second chamber 54 and tank 28 and configured to regulate a flow of fluid from second chamber 54 to tank 28 in response to the area command signal. Specifically, rod-end drain valve 38 may include a proportional spring biased valve mechanism that is solenoid actuated and configured to move between a first position at which fluid is blocked from flowing from second chamber 54 and a second position at which fluid is allowed to flow from second chamber 54. Rod-end drain valve 38 may be movable to any position between the first and second positions to vary the rate of flow from second chamber 54, thereby affecting the velocity of hydraulic actuators 20*a-c*. It is contemplated that rod-end drain valve 38 may alternatively be hydraulically actuated, mechanically actuated, pneumatically actuated, or actuated in any other suitable manner.

Head and rod-end supply and drain valves 32-38 may be fluidly interconnected. In particular, head and rod-end supply valves 32, 36 may be connected in parallel to a common supply passageway 60 that originates from primary source 30. Head and rod-end drain valves 34, 38 may be connected in parallel to a common drain passageway 62 leading to tank 28. Head-end supply and drain valves 32, 34 associated with hydraulic actuators 20*a, b* may be connected in parallel to a first chamber passageway 64 for selectively supplying and draining first chambers 52 of hydraulic actuators 20*a, b*. Head-end supply and drain valves 32, 34 associated with hydraulic actuator 20*c* may be connected in parallel to a first chamber passageway 66 for selectively supplying and draining first chamber 52 of hydraulic actuator 20*c*. Rod-end supply and drain valves 36, 38 may be connected in parallel to a common second chamber passageway 68 for selectively supplying and draining second chambers 54. An additional flow-controlled independent metering valve 70, similar to head and rod-end supply valves 32 and 36, may be disposed within common second chamber passageway 68, between the rod-end supply and drain valves 36, 38 associated with hydraulic actuators 20*a, b* and the rod-end supply and drain valves 36, 38 associated with hydraulic actuator 20*c*. An additional area controlled independent metering valve 72, similar to head and rod-end drain valves 34 and 38, may be disposed within a fluid passageway 74 connecting common supply passageway 60 and common drain passageway 62.

Accumulator 40 may embody a pressure vessel filled with a compressible gas that is configured to store pressurized fluid for future use as a source of fluid power. The compressible gas may include, for example, nitrogen or another appropriate compressible gas. As fluid in communication with accumulator 40 exceeds a predetermined pressure, it may flow into accumulator 40. Because the nitrogen gas is compressible, it may act like a spring and compress as the fluid flows into accumulator 40. When the pressure of the fluid within passageways communicated with accumulator 40 drops below a predetermined pressure, the compressed nitrogen within accumulator 40 may expand and urge the fluid from within accumulator 40 to exit accumulator 40. It is contemplated that accumulator 40 may alternatively embody a spring biased type of accumulator, if desired. The predetermined pressure may be in the range of 150-200 bar.

Accumulator 40 may be connected to receive pressurized fluid from and discharge pressurized fluid to various passageways of hydraulic system 26. In particular, accumulator 40 may be in communication with first chamber passageways 64 and 66 via a fluid passageway 76, with suction line 45 via a fluid passageway 78, with transmission unit 44 via a fluid passageway 80, and with energy recovery device 42 via a fluid passageway 81. A flow controlled independent metering valve 82 may be disposed within fluid passageway 76, between first chamber passageway 64 and accumulator 40. A flow controlled independent metering valve 84 may be disposed within fluid passageway 76, between first chamber passageway 66 and independent metering valve 82. A flow controlled independent metering valve 86 may be disposed within fluid passageway 78, between the suction inlet of primary source 30 and accumulator 40. Two flow controlled independent metering valves 88, 90 may be disposed within fluid passageway 80, between transmission unit 44 and accumulator 40. An area controlled independent metering valve 92 may be disposed within fluid passageway 81, between energy recovery device 42 and accumulator 40. It is contemplated that additional or fewer independent metering valves may be associated with accumulator 40, and/or that the independent metering valves of hydraulic system 26 may be any one of flow or area controlled, if desired.

Accumulator 40 may be associated with an optional ride control feature of work machine 10. In particular, accumulator 40 may be in communication with common supply passageway 60 by way of a first ride control passageway 116, and a second ride control passageway 118. A first flow-controlled independent metering valve 120 may be disposed within first ride control passageway 116, and a second flow controlled independent metering valve 122 may be disposed within second ride control passageway 118. When the ride control feature is enabled, pressurized fluid may flow from primary source 30 to fill accumulator 40 by way of first ride control passageway 116, and from accumulator 40 to first chambers 52 of hydraulic actuators 20*a, b* by way of second ride control passageway 118 to dampen travel induced oscillations of hydraulic actuators 20*a, b*.

Energy recovery device 42 may include multiple components fluidly interconnected to recover energy from and condition fluid draining to tank 28. Specifically, energy recovery device 42 may include a driving element 94, a driven element 96, and a means for storing energy 98. Driving element 94 may be connected to receive waste fluid from actuators 20*a-c* and accumulator 40 via common drain passageway 62 and fluid passageways 78, 81, and to direct the fluid to driven element 96 via a fluid passageways 100. Driven element 96 may receive the waste fluid from driving element 94 and draw additional fluid from tank 28 by way of a suction line 102. One or more bypass circuits (not shown) having check valves may be associated with one or both of driving and driven elements 94, 96 and configured regulate the pressure and/or rate of the waste fluid flowing through energy recovery device 42. Driving element 94 may be connected to drive both of driven element 96 and the means for storing energy 98 by way of, for example, a common shaft, a gear train (not shown), a cam mechanism (not shown), a linkage system (not shown), or in any other appropriate manner such that a rotation of driving element 94 results in an actuating motion of the connected components. It is contemplated that any one or all of the components of energy recovery device 42 may be located within tank 28, if desired. It is further contemplated that a means for conditioning fluid could additionally be included within energy recovery device 42 and/or driven by driving element 94 to remove air and/or debris from the fluid flowing therethrough, if desired.

The means for storing energy 98 may function to remove excess energy from hydraulic fluid for later use by hydraulic system 26. For example, the means for storing energy 98 could embody a fixed inertia flywheel, a variable inertia flywheel, an electric flywheel (e.g., an electric power generating device such as a motor/generator), or any other means known in the art for storing excess energy. It is contemplated that the means for storing energy 98 may be connected to the same shaft as driving and driven elements 94, 96 at any suitable location along its length such as, for example, between driving and driven elements 94 and 96, or toward one end the shaft, as illustrated in FIG. 2. It is further contemplated that a clutch device (not shown) may be associated with means 98 to selectively engage and disengage means 98 with the shaft, if desired. It is also contemplated that the means for storing energy 98 may be omitted, if desired.

Transmission unit 44 may include components that cooperate to propel work machine 10. Specifically, transmission unit 44 may embody a hydrostatic device having a motor 104 that is connected to and driven by a transmission pump 106 by way of fluid passageways 108 and 110. Motor 104 may be connected to traction device 14 (referring to FIG. 1) through any manner apparent to one skilled in the art such that an output rotation of motor 104 results in a corresponding propelling motion of traction device 14.

Motor 104 may include a rotary or piston type hydraulic motor movable by an imbalance of pressure. For example, fluid pressurized by transmission pump 106 may be directed to motor 104 via either one of fluid passageways 108 or 110 in response to an input requesting movement of the associated traction device 14 in either a forward or reverse direction. Simultaneously, fluid that has passed through motor 104 may be drained back to the suction side of transmission pump 106. The direction of pressurized fluid to one side of motor 104 and the draining of fluid from an opposing side of motor 104 may create a pressure differential that causes motor 104 to rotate. The direction and rate of fluid flow through motor 104 may determine the rotational direction and speed of traction device 14, while the pressure of the fluid may determine the torque output.

Transmission pump 106 may be connected to pressurize fluid to a predetermined level and may include, for example, a variable or fixed displacement pump configured to produce a variable flow of pressurized fluid. Transmission pump 106 may be drivably connected to power source 12 of work machine 10 by, for example, a countershaft (not shown), a belt (not shown), an electrical circuit (not shown), or in any other suitable manner such that an output rotation of power source 12 results in a pumping action of transmission pump 106. Alternatively, transmission pump 106 may be indirectly connected to power source 12 via a torque converter, a gear box, or in any other manner known in the art.

A resolver 112 may be disposed between fluid passageways 108 and 110 and associated with independent metering valve 88. Resolver 112 may be configured to connect fluid passageway 80 with the one of fluid passageways 108 and 110 that contains the higher pressure fluid. For example, if transmission pump 106 is driving motor 104 with a flow of pressurized fluid in fluid passageway 108, the returning fluid flow in fluid passageway 110 may be at a lower pressure. Accordingly, resolver 112 may open to connect fluid passageway 108 with fluid passageway 80. Conversely, if transmission pump 106 is driving motor 104 with a flow of pressurized fluid in fluid passageway 110, the returning fluid flow in fluid passageway 108 may be at a lower pressure. Accordingly, resolver 112 may open to connect fluid passageway 110 with fluid passageway 80.

A makeup valve 114 may also be disposed between fluid passageways 108 and 110. Makeup valve 114 may be associated with independent metering valve 90 and configured to connect fluid passageway 80 with the one of fluid passageways 108 and 110 that contains the lower pressure fluid. For example, if transmission pump 106 is driving motor 104 with a flow of pressurized fluid in fluid passageway 108, the returning fluid flow in fluid passageway 110 may be at a lower pressure. Accordingly, makeup valve 114 may open to connect fluid passageway 110 with fluid passageway 80. Conversely, if transmission pump 106 is driving motor 104 with a flow of pressurized fluid in fluid passageway 110, the returning fluid flow in fluid passageway 108 may be at a lower pressure. Accordingly, makeup valve 114 may open to connect fluid passageway 108 with fluid passageway 80.

FIG. 3 illustrates a chart depicting exemplary disclosed fluid connections possible during the operation of the hydraulic system 26. FIG. 3 will be discussed in the following section to further illustrate the disclosed control system and its operation.

INDUSTRIAL APPLICABILITY

The disclosed hydraulic system may be applicable to any work machine that includes a hydraulic actuator where efficiency and consistent performance of a driving power source are important. The disclosed hydraulic system captures energy that would otherwise be wasted during the normal operation of the work machine and stores this energy in the form of-pressurized fluid in an accumulator, while simultaneously facilitating consistent performance of an associated power source. The pressurized fluid stored in the accumulator may be used to perform a future operation of the work machine such as, for example, assisting in the movement of a work tool, torque assisting the associated power source, or assisting in the movement of the work machine. Operation of hydraulic system 26 will now be described.

Hydraulic actuators 20*a-c* may be movable by pressurized fluid in response to an operator manipulation of interface devices 24 (referring to FIG. 1). Specifically, as illustrated in FIG. 2, fluid may be pressurized by primary source 30 and directed to head and rod-end supply and drain valves 32-38. In response to an operator input to move work tool 18, one or more of head and rod-end supply and drain valves 32-38 may move to open positions, thereby directing the pressurized fluid to and draining fluid from specific chambers within hydraulic actuators 20*a-c*. For example, as shown in the table of FIG. 3, in order to extend hydraulic actuators 20*a, b* and raise work tool 18, head-end supply valve 32 and rod-end drain valve 38 may be opened. Pressurized fluid may then flow from primary source 30 through common supply passageway 60, through head-end supply valve 32, through first chamber supply passageway 64, and into first chambers 52. As the pressure of the fluid within first chambers 52 acts on first hydraulic surfaces 56, piston assemblies 50 may be urged to extend from tubes 48. Because rod-end drain valve 38 is open, the fluid within second chambers 54 may be pushed out of hydraulic actuators 20*a, b*, through rod-end drain valve 38, through common drain passageway 62, and to tank 28 via driving element 94. In contrast, in order to retract hydraulic actuators 20*a, b* and lower work tool 18, rod-end supply valve 36 and head-end drain valve 34 may be opened. With rod-end supply and head-end drain valves 36, 34 open, pressurized fluid may then flow from primary source 30 through common supply passageway 60, through rod-end supply valve 36, through second chamber passageway 68, and into second chambers 54. As the pressure of the fluid within second chambers 54 acts on second hydraulic surfaces 58, piston assemblies 50 may be urged to retract into tubes 48. Because head-end drain valve 34 is open, the fluid within first chambers 52 may be pushed out of hydraulic actuators 20*a, b*, through head-end drain valve 34, through common drain passageway 62, and to tank 28 via driving element 94. The conventional extension and retraction of hydraulic actuator 20*c* that results in the tilting of work tool 18 may be similar to that of hydraulic actuators 20*a, b* and, thus, the description thereof is omitted from this disclosure.

As the fluid drains from hydraulic actuators 20*a-c* during an extension or retraction operation, it may still be at a pressure level greater than the pressure of the fluid within tank 28. If the draining fluid were simply directed to join the lower pressure fluid within tank 28, the energy associated with the draining fluid would be lost. To improve efficiency of hydraulic system 26, the energy of the draining fluid may be recovered by directing the draining fluid to energy recovery device 42.

As the draining fluid flows into energy recovery device 42, it may first flow through and urge driving element 94 to rotate (referring to FIG. 2). After imparting rotational energy to driving element 94, some or all of the draining fluid may be directed to driven element 96. It is contemplated that a portion of the draining fluid may be directed to join the lower pressure fluid already within tank 28 before or after flowing through driving element 94, if desired. While flowing through energy recovery device 42, air and/or debris may be centrifugally removed from the fluid.

As the shaft connecting driving and driven elements 94, 96 is rotated by driving element 94, driven element 96 and the means for storing energy 98 may be actuated to pressurize fluid and store energy, respectively. In particular, as driven element 96 is rotated, the fluid from driving element 94 and tank 28 may be drawn into driven element 96, pressurized, and directed to primary source 30 via suction lines 102 and 45. During situations in which the recovered energy is not immediately demanded, the energy may be stored kinetically or electrically within means 98 for later use by hydraulic system 26. It is also contemplated that the pressurized fluid may be directed from driven element 96 to accumulator 40, if desired.

During certain circumstances known as overrunning conditions, the weight of work tool 18 and the load contained therein acting through piston assemblies 50 of hydraulic actuators 20*a, b* may pressurize the fluid in first chambers 52 to a level suitable for storage within accumulator 40 or for use by other hydraulic actuators of work machine 10. If this pressurized fluid were directed to tank 28 instead of accumulator 40 or the other actuators, the energy of the pressurized fluid would be wasted. By storing the pressurized fluid in accumulator 40 or otherwise redirecting the pressurized fluid, at least a portion of the potential energy of an elevated work tool 18 and load may be captured and, as explained in greater detail below, may be used to assist other hydraulic actuators and/or work machine 10 in performing future tasks.

When a retraction of hydraulic actuators 20*a, b* and an extension of hydraulic actuator 20*c* are simultaneously requested, such as during a work tool 18 lower and tilt back operation, regeneration may be possible. As shown in FIG. 3, to accomplish this operation, the head-end supply valve 32 associated with hydraulic actuator 20*c*, and independent metering valves 70 and 82 may be opened. In this configuration, pressurized fluid may flow from primary source 30 through common supply passageway 60, through the head-end supply valve 32 associated with hydraulic actuator 20*c*, and into first chamber 52 of hydraulic actuator 20*c*. Simultaneously, fluid from second chamber 54 of hydraulic actuator 20*c* may be forced through common second chamber passageway 68, independent metering valve 70, and into second chambers 54 of hydraulic actuators 20*a, b*. The ensuing motion of piston assemblies 50 of hydraulic actuators 20*a, b* may then cause fluid to flow from the first chambers 52 thereof through common first chamber passageway 64, independent metering valve 82, and into accumulator 40, where it may be stored for later use. It is also contemplated that hydraulic actuator 20*c* may retract to rack back work tool 18 in some situations.

The fluid from within accumulator 40 may be used to assist the extension of hydraulic actuators 20*a, b*. As also shown in FIG. 3, to accomplish this operation, the head-end supply and rod-end drain valves 32, 38 associated with hydraulic actuators 20*a, b*, and independent metering valve 86 may be opened. In this configuration, pressurized fluid may flow from accumulator 40 to the suction side of primary source 30, thereby supplementing the flow normally available from primary source 30. The supplemented flow may then be directed through head-end supply and rod-end drain valves 32, 38 in the conventional way described above to extend hydraulic actuators 20*a, b*. It is contemplated that accumulator 40 may assist any hydraulic actuator of work machine 10 in this manner (e.g., by directing pressurized fluid from accumulator 40 to the suction side of primary source 30 via independent metering valve 86, as illustrated in FIG. 3). It is further contemplated that, in this same manner, accumulator 40 may torque assist power source 12 by driving primary source 30 like a motor during a high power demand or starting operation of power source 12. Check valve 47 may facilitate this assistance from accumulator 40, while energy recovery device 42 may prevent cavitation typically associated with a check valve in the suction side of a pump.

During the assisted extension of hydraulic actuators 20*a, b*, it may also be possible to simultaneously retract hydraulic actuator 20*c* such as during a work tool raise and dump operation. As shown in FIG. 3, to accomplish this operation, the rod-end drain valve 38 associated with hydraulic actuators 20*a, b*, independent metering valve 86, the rod-end supply valve 36 associated with hydraulic actuator 20*c*, and independent metering valve 84 may be opened. In this configuration, pressurized fluid may flow from accumulator 40 to the suction side of primary source 30, thereby supplementing the flow normally available from primary source 30. The supplemented flow may then be directed through common supply passageway 60, the rod-end supply valve 36 associated with hydraulic actuator 20*c*, and into second chamber 54 of hydraulic actuator 20*c*. Simultaneously, fluid from first chamber 52 of hydraulic actuator 20*c* may be forced through first chamber passageway 66, independent metering valve 84, first chamber passageway 64, and into first chambers 52 of hydraulic actuators 20*a, b*. As piston assemblies 50 of hydraulic actuators 20*a, b* extend from tubes 48, the fluid from within the associated second chambers 54 may be forced from second chambers 54 through rod-end drain valve 38, common drain passageway 62, and energy recovery device 42.

Accumulator 40 may also be used in conjunction with a ride control feature of work machine 10. In particular, after extending hydraulic actuators 20*a, b*, it may be desirable to travel long distances at a substantially high speed. However, due to uneven or rough terrain, the raised work tool 18 and load contained therein may cause work machine 10 to pitch, lope, or bounce undesirably. Accumulator 40 may be selectively connected with hydraulic actuators 20*a, b* to absorb and dissipate some of the energy associated with the undesired movements of work machine 10.

As illustrated in FIG. 3, when the ride control feature has been enabled, independent metering valves 82 and 122, and head-end supply valve 32 may be selectively opened to store pressurized fluid in and release pressurized fluid from accumulator 40 depending on the fluctuating pressure within first chambers 52 of hydraulic actuators 20*a, b*. For example, as work tool 18 lurches downward due to encountered terrain, the pressure within first chamber 52 may increase. To dampen the movement of work tool 18, this increased pressure may be released to accumulator 40 through first chamber passageway 64, fluid passageway 76, and independent metering valve 82. In contrast, as work tool 18 lurches upward, the pressure within first chambers 52 may decrease. To prevent an abrupt downward recoil of work tool 18, pressurized fluid from accumulator 40 may be directed to first chambers 52 via second ride control passageway 118, independent metering valve 122, and head-end supply valve 32.

During the cushioning of work tool 18 described above, the position of work tool 18 may deviate from a desired position. In order to return work tool 18 to the desired position, the flows of fluid into and out of accumulator 40 may be controlled in a manner similar to that described above. That is, if the position of piston assemblies 50 are more retracted than desired, pressurized fluid from accumulator 40 may be directed to first chambers 52. Similarly, if the position of piston assemblies 50 are more extended than desired, fluid may be released from first chambers 52 to accumulator 40. To ensure the fluid volume and pressure within accumulator 40 are sufficient for the ride control feature, pressurized fluid may be directed from primary source 30 to charge accumulator 40 via first ride control passageway 116 and independent metering valve 120.

During travel of work machine 10, there may be situations in which pressurized fluid from transmission unit 44 may be regenerated. For example, during a bucket-pinning situation, where the work machine is stationary, transmission pump 106 may still be pressurizing fluid and directing the pressurized fluid to motor 104. In this situation, motor 104 may exert an excessive torque on traction device 14 that causes the traction device 14 to slip or spin uselessly. Instead, a portion of the pressurized fluid could be redirected from fluid passageways 108 or 110 into accumulator 40 or to one or more of hydraulic actuators 20*a-c* to assist in the movement of work tool 18. Specifically, as illustrated in FIG. 3, independent metering valve 88 may be opened to allow fluid to flow from one of fluid passageways 108 or 110 through resolver 112 of transmission unit 44, independent metering valve 88, fluid passageway 80, and into accumulator 40. Thus, the energy that would have been otherwise wasted as excessive torque, may be saved for future use in accumulator 40 or used to boost work tool 18 or power source 12.

There may also be times when it is desirable to transfer pressurized fluid from accumulator 40 to transmission unit 44. In this situation, independent metering valve 90 may be opened to allow fluid to flow from accumulator 40 through fluid passageway 80, independent metering valve 90, makeup valve 114, and into one of fluid passageways 108 or 110.

Many advantages are associated with the disclosed hydraulic system. For example, by directing the fluid stored in accumulator 40 to the suction inlet of primary source 30, the amount of pressurized fluid required from primary source 30 may be reduced. Thus, a smaller low cost source may be utilized that consumes less external energy and thereby increases the overall efficiency of work machine 10. By using the pressurized fluid stored in accumulator 40 or the pressurized fluid released from hydraulic actuator 20*c* to move hydraulic actuators 20*a, b*, the amount of pressurized fluid required from primary source 30 may be further reduced. In this manner, the efficiency of work machine 10 may be further improved.

Also, because accumulator 40 may be isolated from the suction side of primary source 30 during a regeneration event, accumulator 40 may be filled with fluid having a higher pressure than otherwise available. That is, because fluid draining from one or more of hydraulic actuators 20*a-c* may be directed only to accumulator 40 without pressure losses to primary source 30, the pressure of the fluid may remain high, on the order of 150-200 bar. This higher pressure may lend itself to additional uses such as, for example, ride control.

In addition, because regenerated fluid (e.g., the fluid from accumulator 40 and/or from hydraulic actuators 20*a-c*) may be used to assist power source 12, the amount of fuel required to accelerate work machine 10 to a given speed or to maintain the speed of work machine 10 may be reduced. The decreased fuel may reduce the operating cost of work machine 10. Alternatively, because of the power assist afforded by fluid regeneration, it may be possible to reduce the overall size of power source 12. Further, because of the assistance from accumulator 40 and/or from hydraulic actuators 20*a-c*, power source 12 may be operated at a more constant speed, regardless of changing loads on work machine 10. The nearly constant speed of power source 12 may lower emissions, noise levels, and fuel consumption.

Further, hydraulic system 26 may be used to decelerate work machine 10 or otherwise selectively reduce the power output available to other work machine systems. In particular, a force opposing the movement of work machine 10 may be exerted by engaging primary source 30 and directing the generated pressurized fluid to accumulator 40. The torque consumed by primary source 30 to pressurize the fluid may oppose the rotation of power source 12 and, therefore, may oppose the operation of the transmission unit 44. In this same manner, hydraulic system 26 may be utilized to minimize slippage of traction device 14, by consuming power from power source 12, thereby reducing the power available to traction device 14 via transmission unit 44. In contrast, regenerated fluid from hydraulic system 26 may be made available to transmission unit 44 to increase a speed and/or torque output of transmission unit 44.

Finally, because primary source 30 may be effectively utilized to pressurize fluid even during a regeneration event, the power output of power source 12 may be more consistent. Specifically, the ability of primary source 30 to operate during regeneration, may allow for primary source 30 to be operated nearly continuously. This constant draw of power from power source 12 may minimize inefficient fuel-consuming fluctuations of power source 12. In addition, the minimal number of metering valves required to facilitate this operation may allow for a low cost system.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A hydraulic system, comprising:

a tank configured to hold a supply of fluid;

a primary source configured to pressurize the fluid and having a suction inlet and a discharge outlet;

a first actuator configured to receive pressurized fluid from the discharge outlet of the primary source;

an accumulator in fluid communication with the tank, the suction inlet of the primary source, and the first actuator;

a first valve mechanism disposed between the suction inlet of the primary source and the accumulator, wherein the valve mechanism is movable between a first position at which fluid returning from the first actuator is directed to the suction inlet of the primary source, and a second position at which fluid returning from the first actuator is directed to only the accumulator;

an energy recovery device in fluid communication with the first actuator, the accumulator, and the primary source;

a second valve mechanism disposed between the energy recovery device and the accumulator and first actuator; and a third valve mechanism disposed between the suction inlet of the primary source and the energy recovery device, wherein the accumulator is selectively fluidly communicated with the suction inlet of the primary source at a location between the third valve mechanism and the suction inlet of the primary source.

2. The hydraulic system of claim 1, further including:

a fourth valve mechanism disposed between the accumulator and the first actuator; and a fifth valve mechanism disposed between the accumulator and the first actuator, wherein the fourth and fifth valve mechanisms are configured to allow fluid to flow from the first actuator to the accumulator and from the accumulator to the first actuator during a ride control mode of operation.

3. The hydraulic system of claim 1 wherein the energy recovery device includes a driving element and a driven element connected by a common shaft.

4. The hydraulic system of claim 1, further including a transmission unit configured to receive fluid from and expel fluid to the accumulator.

5. The hydraulic system of claim 1, wherein fluid from the first actuator is directed to the accumulator simultaneous to the direction of pressurized fluid from the primary source to the first actuator.

6. The hydraulic system of claim 1, further including a second actuator in communication with the tank, the primary source, the first actuator, and the accumulator, wherein the first actuator is configured to receive pressurized fluid from the primary source and simultaneously expel pressurized fluid to the second actuator.

7. The hydraulic system of claim 4, wherein the second actuator is configured to selectively expel fluid to the first actuator.

8. A hydraulic system, comprising:
a tank configured to hold a supply of fluid;
a primary source configured to pressurize the fluid and having a suction inlet and a discharge outlet;
a first actuator configured to receive pressurized fluid from the discharge outlet of the primary source;
an accumulator in fluid communication with the tank, the suction inlet of the primary source, and the first actuator, wherein fluid from the first actuator is directed to the accumulator simultaneous to the direction of pressurized fluid from the primary source to the first actuator;
an energy recovery device in fluid communication with the first actuator, the accumulator, and the suction inlet of the primary source;
a second valve mechanism disposed between the energy recovery device and the accumulator and first actuator; and
a third mechanism disposed between the suction inlet of the primary source and the energy recovery device, wherein the accumulator is selectively fluidly communicated with the suction inlet of the primary source at a location between the third valve mechanism and the suction inlet of the primary source.

9. The hydraulic system of claim 8, further including:
a fourth valve mechanism disposed between the accumulator and the first actuator; and
a fifth valve mechanism disposed between the accumulator and the first actuator, wherein the fourth and fifth valve mechanisms are configured to allow fluid to flow from the first actuator to the accumulator and from the accumulator to the first actuator during a ride control mode of operation.

10. The hydraulic system of claim 8, wherein the energy recovery device includes a driving element and a driven element connected by a common shaft.

11. The hydraulic system of claim 8, further including a transmission unit configured to receive fluid from and expel fluid to the accumulator.

12. The hydraulic system of claim 8, further including a second actuator in communication with the tank, the primary source, the first actuator, and the accumulator, wherein the first actuator is configured to receive pressurized fluid from the primary source and simultaneously expel pressurized fluid to the second actuator.

13. The hydraulic, system of claim 12, wherein the second actuator is configured to selectively expel fluid to the first actuator.

14. A hydraulic system, comprising:
a tank configured to hold a supply of fluid;
a primary source configured to pressurize the fluid;
a first actuator in communication with the tank and the primary source;
a second actuator in communication with the tank, the primary source, and the first actuator, wherein the first actuator is configured to receive pressurized fluid from the primary source and simultaneously expel pressurized fluid to the second actuator;
an energy recovery device in fluid communication with the first actuator, the accumulator, and the suction inlet of the primary source;
a second valve mechanism disposed between the energy recovery device and the accumulator and first actuator; and
a third valve mechanism disposed between the primary source and the energy recovery device, wherein the accumulator is selectively fluidly communicated with the primary source at a location between the third valve mechanism and the primary source.

15. The hydraulic system of claim 14, further including:
a fourth valve mechanism disposed between the accumulator and the first actuator; and
a fifth valve mechanism disposed between the accumulator and the first actuator, wherein the fourth and fifth valve mechanisms are configured to allow fluid to flow from the first actuator to the accumulator and from the accumulator to the first actuator during a ride control mode of operation.

16. The hydraulic system of claim 14, wherein the energy recovery device includes a driving element and a driven element connected by a common shaft.

17. The hydraulic system of claim 14, further including a transmission unit configured to receive fluid from and expel fluid to the accumulator.

18. A hydraulic system, comprising:
a tank configured to hold a supply of fluid;
a primary source configured to pressurize the fluid;
a first actuator in communication with the tank and the primary source;
a second actuator in communication with the tank, the primary source, and the first actuator, wherein the first actuator is configured to selectively expel fluid to the second actuator, and the second actuator is configured to selectively expel fluid to the first actuator;
an energy recovery device in fluid communication with the first actuator, an accumulator, and the primary source;
a second valve mechanism disposed between the energy recovery device and the accumulator and first actuator; and
a third mechanism disposed between the primary source and the energy recovery device, wherein the accumulator is selectively fluidly communicated with the primary source at a location between the third valve mechanism and the primary source.

19. The hydraulic system of claim 18, further including:
a fourth valve mechanism disposed between the accumulator and the first actuator; and
a fifth valve mechanism disposed between the accumulator and the first actuator, wherein the fourth and fifth valve mechanisms are configured to allow fluid to flow from the first actuator to the accumulator and from the accumulator to the first actuator during a ride control mode of operation.

20. The hydraulic system of claim 18, wherein the energy recovery device includes a driving element and a driven element connected by a common shaft.

21. The hydraulic system of claim 18, further including a transmission unit configured to receive fluid from and expel fluid to the accumulator.

22. A hydraulic system, comprising:
a tank configured to hold a supply of fluid;
a primary source configured to pressurize the fluid;
a first actuator in communication with the tank and the primary source, the first actuator having a first chamber and a second chamber;
a second actuator in communication with the tank, the primary source, and the first actuator, the second actuator having a third chamber and a fourth chamber;
a first valve mechanism configured to fluidly communicate the primary source and the first chamber;
a second valve mechanism configured to fluidly communicate the primary source and the second chamber;
a third valve mechanism configured to fluidly communicate the first chamber and the tank;

a fourth valve mechanism configured to fluidly communicate the second chamber and the tank;

a fifth valve mechanism configured to fluidly communicate the primary source and the third chamber;

a sixth valve mechanism configured to fluidly communicate the primary source and the fourth chamber;

a seventh valve mechanism configured to fluidly communicate the third chamber and the tank;

an eight valve mechanism configured to fluidly communicate the fourth chamber and the tank;

a ninth valve mechanism configured to fluidly communicate the second and fourth chambers;

a tenth valve mechanism configured to fluidly communicate the first and third chambers;

an accumulator;

an eleventh valve mechanism disposed between the first chamber and the accumulator;

a twelfth valve mechanism disposed between the third chamber and the accumulator; and a thirteenth valve mechanism disposed between the accumulator and the primary source.

23. A machine, comprising:

a power source configured to produce a power output;

a traction device operatively driven by the power source;

a work tool;

a tank configured to hold a supply of fluid;

a primary source driven by the power source to pressurize the fluid and having a suction inlet and a discharge outlet;

a first actuator operatively connected to move the work tool and configured to receive pressurized fluid from the discharge outlet of the primary source;

an accumulator in fluid communication with the tank, the suction inlet of the primary source, and the first actuator;

a first valve mechanism disposed between the suction inlet of the primary source and the accumulator, wherein the valve mechanism is movable between a first position at which fluid returning from the first actuator is directed to the suction inlet of the primary source, and a second position at which fluid returning from the first actuator is directed to only the accumulator;

an energy recovery device in fluid communication with the first actuator, the accumulator, and the primary source;

a second valve mechanism disposed between the energy recovery device and the accumulator and first actuator; and a third valve mechanism disposed between the suction inlet of the primary source and the energy recovery device, wherein the accumulator is selectively fluidly communicated with the suction inlet of the primary source at a location between the third valve mechanism and the suction inlet of the primary source; and the energy recovery device includes a driving element and a driven element connected by a common shaft.

24. The machine of claim 23, further including:

a fourth valve mechanism disposed between the accumulator and the first actuator; and a fifth valve mechanism disposed between the accumulator and the first actuator, wherein the fourth and fifth valve mechanisms are configured to allow fluid to flow from the first actuator to the accumulator and from the accumulator to the first actuator during a ride control mode of operation.

25. The machine of claim 23, further including a transmission unit configured to receive fluid from and expel fluid to the accumulator.

26. The machine of claim 23, wherein fluid from the first actuator is directed to the accumulator simultaneous to the direction of pressurized fluid from the primary source to the first actuator.

27. The machine of claim 23, further including a second actuator in communication with the tank, the primary source, the first actuator, and the accumulator, wherein:

the first actuator is configured to receive pressurized fluid from the primary source and simultaneously expel pressurized fluid to the second actuator; and the second actuator is configured to selectively expel fluid to the first actuator.

* * * * *